United States Patent
Yu

(10) Patent No.: US 8,418,629 B2
(45) Date of Patent: Apr. 16, 2013

(54) PLATFORM FOR AN ELECTRONIC DEVICE WITH A SCREEN

(76) Inventor: David Chen Yu, Laguna Niguel, CA (US)

(*) Notice: Subject to any disclaimer, the term of this patent is extended or adjusted under 35 U.S.C. 154(b) by 235 days.

(21) Appl. No.: 13/037,198

(22) Filed: Feb. 28, 2011

(65) Prior Publication Data

US 2012/0217852 A1   Aug. 30, 2012

(51) Int. Cl.
*A47B 23/00* (2006.01)
(52) U.S. Cl.
USPC .......................................... 108/43; 224/930
(58) Field of Classification Search ........... 108/42–43; 224/400, 603–605, 623, 201, 930
See application file for complete search history.

(56) References Cited

U.S. PATENT DOCUMENTS

| | | | | |
|---|---|---|---|---|
| 434,559 A * | 8/1890 | Fish | | 108/43 |
| 1,232,089 A * | 7/1917 | Riebe | | 108/43 |
| 1,542,163 A * | 6/1925 | Morde | | 224/646 |
| 2,312,608 A * | 3/1943 | Wadsack | | 132/291 |
| 2,685,757 A * | 8/1954 | Mirigian | | 248/444 |
| 3,215,453 A * | 11/1965 | Malcom, Jr. | | 40/546 |
| 3,541,976 A * | 11/1970 | Rozas | | 108/43 |
| 4,715,293 A * | 12/1987 | Cobbs | | 108/43 |
| 5,074,222 A * | 12/1991 | Welch | | 108/43 |
| 5,186,375 A * | 2/1993 | Plonk | | 224/623 |
| 5,221,032 A * | 6/1993 | Bott et al. | | 224/270 |
| 5,388,530 A * | 2/1995 | Jacobus | | 108/43 |
| 5,850,956 A * | 12/1998 | Hayward, Jr. | | 224/270 |
| 6,036,150 A * | 3/2000 | Lehrman | | 248/241 |
| 6,101,086 A * | 8/2000 | Kim et al. | | 361/679.55 |
| 6,675,721 B2 * | 1/2004 | Zeiders | | 108/43 |
| 6,772,980 B2 * | 8/2004 | O'Neill | | 248/118.1 |
| 8,157,137 B1 * | 4/2012 | Laird | | 224/258 |
| 8,267,294 B2 * | 9/2012 | Yu et al. | | 224/623 |
| 2007/0151487 A1 * | 7/2007 | Villapanda et al. | | 108/43 |
| 2009/0272779 A1 * | 11/2009 | Vu | | 224/677 |
| 2010/0307385 A1 * | 12/2010 | Raney et al. | | 108/43 |

* cited by examiner

*Primary Examiner* — Hahn V Tran

(57) ABSTRACT

The present invention is a platform for an electronic device such as a tablet computer or personal video player. The platform for an electronic device with a screen preferably comprises a rectangular device case with a landscape position and a portrait position and a lockable entry port lid. The case has a view port for the screen and four attachment blade ports. One blade port is on each side of the device case. The platform has two adjustable support legs with an attachment blade, padded end and a string lock. The attachment blades are insertable into the blade ports and lock with a snap tab into the port. The platform further has a length of string with a sleeve of padding and an adjustment loop attached to each leg. The string can be adjusted so the platform has a deployed mode and a carrying mode.

7 Claims, 4 Drawing Sheets

PLATFORM FOR AN ELECTRONIC DEVICE WITH A SCREEN

TECHNICAL FIELD

The present invention is a platform for an electronic device with a screen such as a tablet computer or personal video player.

BACKGROUND OF THE INVENTION

Personal electronic devices have become extremely popular, providing on-the-go entertainment and data access. While many devices are hand-held size, the popularity of these devices has led to the introduction of larger tablet-style devices with larger screens. These larger devices may also allow a user to access the Internet using a keyboard appearing on the screen.

Tablet-style personal electronic devices may require a user to use both hands, particularly when trying to enter data on the on-screen keyboard. Because these devices are larger, a user may need to place the device on a table to enter the data. In addition, the larger size of these devices may cause a user's hands and arms to become tired when holding the device for a long period of time, such as when viewing a movie.

One reason for the great popularity of tablet-style personal electronic devices is their portability. Smaller than a laptop, tablet-style devices feature screens that may be difficult to view under direct light or sunlight. In this situation the user may be forced to hold the device in an uncomfortable position in order to have the best viewing quality on the screen.

Accordingly, a platform for an electronic device with a screen that is light-weight, portable and positions the device in front of the user for use, viewing and/or input is needed.

SUMMARY OF THE INVENTION

The present invention is a platform for an electronic device such as a tablet computer or personal video player. The platform for an electronic device with a screen preferably comprises a rectangular device case with a landscape position and a portrait position and a lockable entry port lid. The case has a view port for the screen and four attachment blade ports. One blade port is on each side of the device case. The platform has two adjustable support legs with an attachment blade, padded end and a string lock. The attachment blades are insertable into the blade ports and lock with a snap tab into the port. The platform further has a length of string with a sleeve of padding and an adjustment loop attached to each leg. The string can be adjusted so the platform has a deployed mode and a carrying mode.

BRIEF DESCRIPTION OF THE SEVERAL VIEWS OF THE DRAWINGS

The present invention described herein will become apparent from the following detailed description considered in connection with the accompanying drawings, which disclose several embodiments of the invention. It should be understood, however, that the drawings are designed for the purpose of illustration and not as limits of the invention.

DETAILED DESCRIPTION OF THE INVENTION

Figure 1:
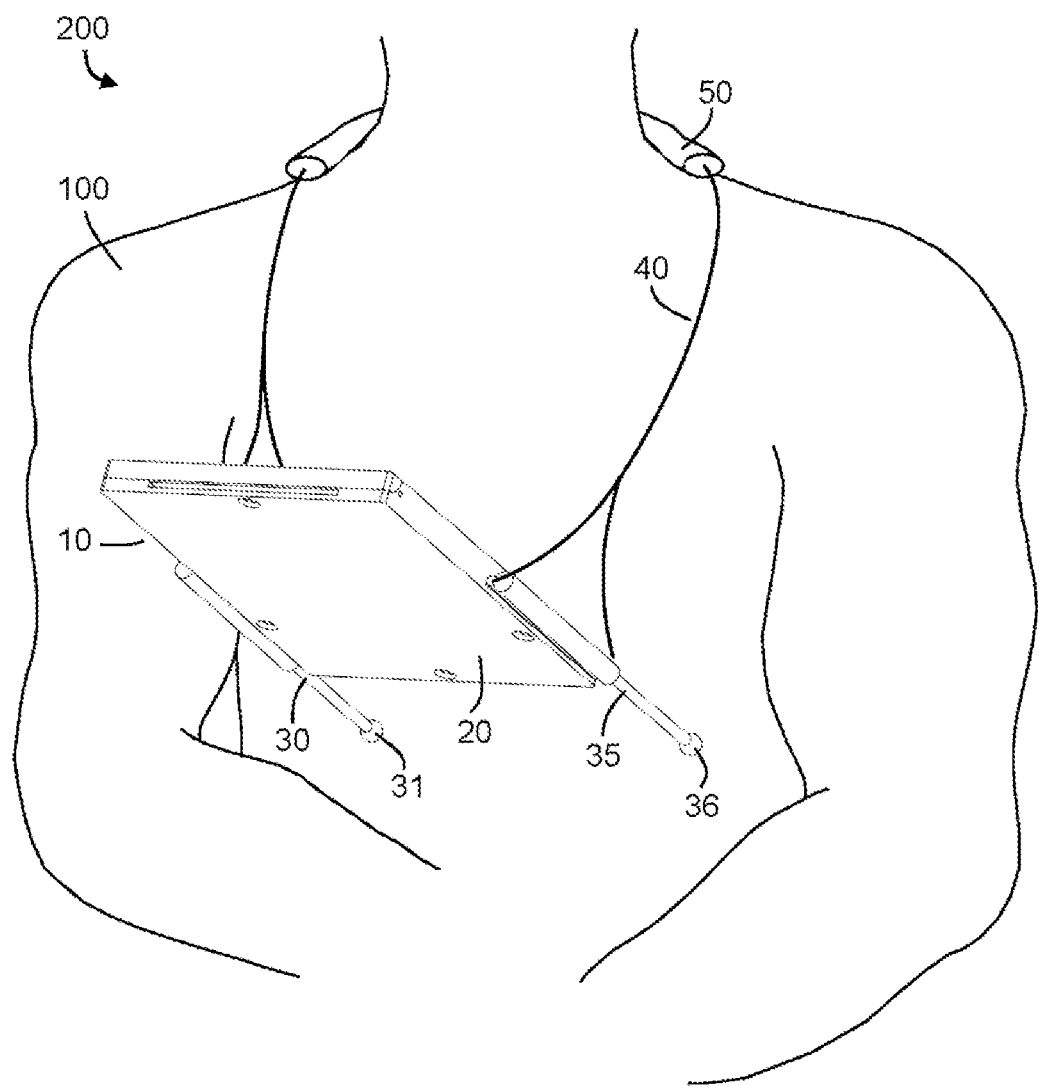
FIG. 1 is a perspective view of a preferred embodiment of the invention in a deployed position.

Various embodiments are now described with reference to the drawings, wherein like reference numerals are used to refer to like elements throughout. In the following description, for purposes of explanation, numerous specific details are set forth in order to provide a thorough understanding of one or more embodiments. It may be evident, however, that such embodiment(s) may be practiced without these specific details. In other instances, well-known structures and devices are shown in block diagram form in order to facilitate describing one or more embodiments.

In the following paragraphs, the present invention will be described in detail by way of example with reference to the attached drawings. Throughout this description, the preferred embodiment and examples shown should be considered as exemplars, rather than as limitations on the present invention. As used herein, the "present invention" refers to any one of the embodiments of the invention described herein, and any equivalents. Furthermore, reference to various feature(s) of the "present invention" throughout this document does not mean that all claimed embodiments or methods must include the referenced feature(s).

Figure 2:
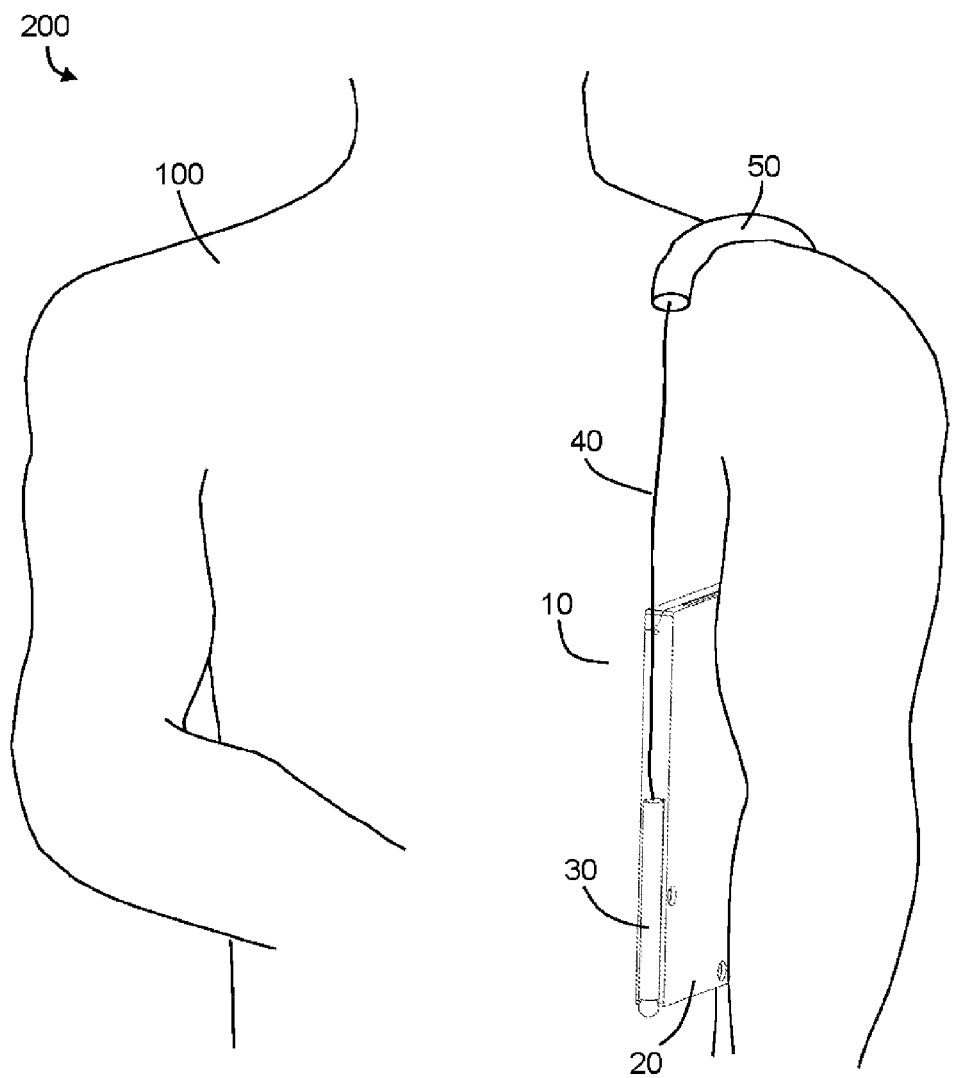
FIG. 2 is a perspective view of a preferred embodiment of the invention in a carrying position.

Referring now to FIG. 1, a preferred embodiment of the invention 10 is shown in a deployed position on a user 100. As shown, a device case 20 supports an electronic device 200 in front of a user 100 on his or her chest. The device case 20 preferably has two adjustable support legs 30 and 35 that extend from the device case 20 to the user's body. The legs 30 and 35 preferably end in padded ends 31, 36. The ends 31, 36 are preferably made of rubber, urethane, or some other soft material to cushion the ends of the legs against the user's body and stabilize the device case 20 for use and/or viewing. A length of string 40 preferably suspends the device case 20 from the around the neck of the user. The string 40 is preferably adjustable. The term "string" here is used generally and can mean any type of string, yarn, cord, or rope of natural or man-made fibers or any combination thereof. A sleeve of padding 50 preferably encases at least a portion of the length of string 40 to cushion the neck of the user when the platform is in a deployed position as shown in FIG. 1 or the shoulder of the user when the platform is in a carrying position as shown in FIG. 2. The sleeve 50 can be made of any type of padding or combination of materials such as foam or other cushioned materials. The viewing angle of the platform 10 can be adjusted to any angle preferred by the user.

Referring now to FIG. 2, a preferred embodiment of the invention 10 is shown in a carrying position on a user 100. The string 40 and legs 30, 35 are preferably adjusted so that the user 100 can carry the platform 10 on the shoulder. Typically, for carrying, the legs 30, 35 and string 40 are retracted to move the platform 10 to the carrying position. The sleeve 50 around the string 40 cushions the shoulder so that the string 40 does not dig into the user's body or clothing during carrying.

Figure 3:
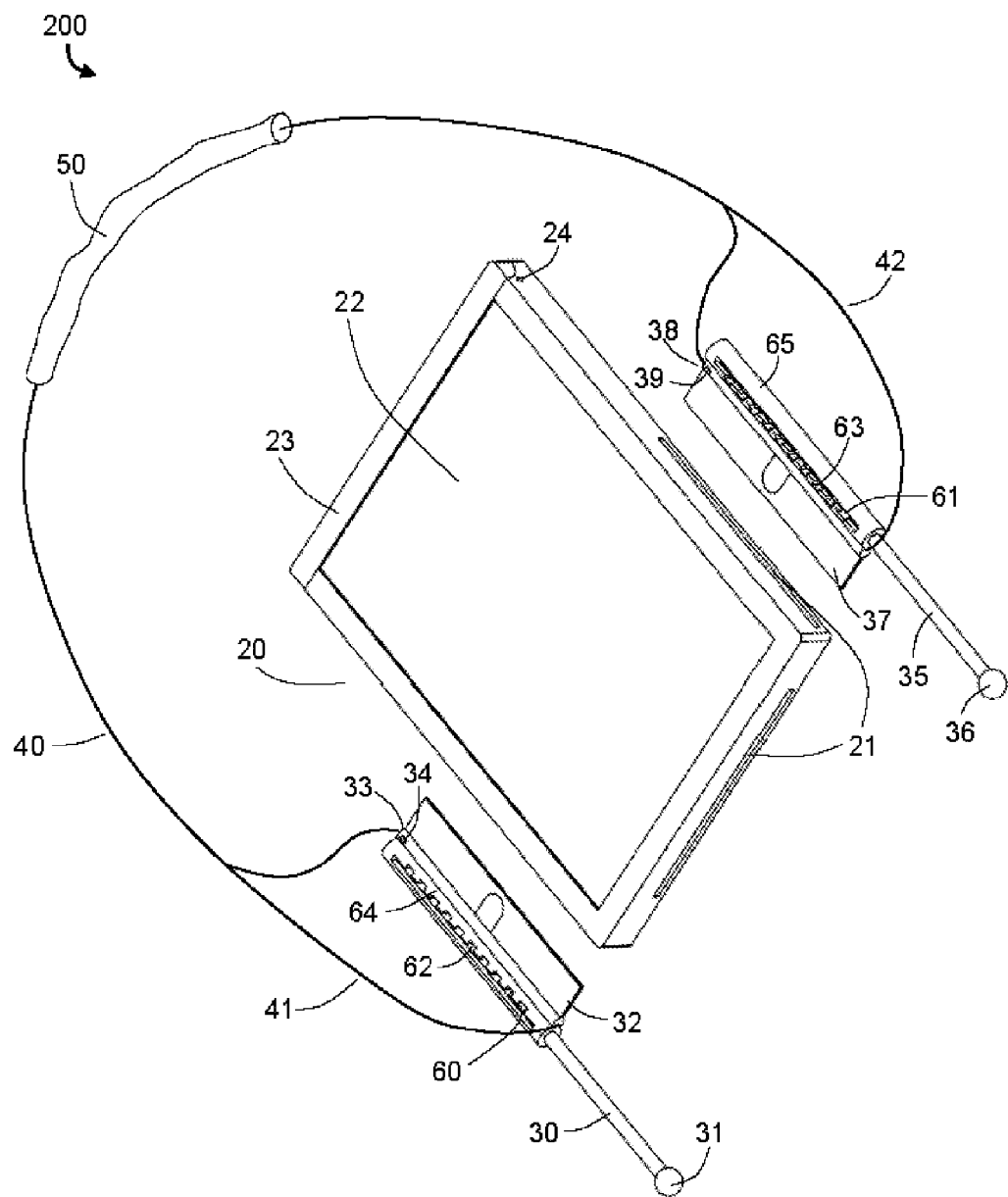
FIG. 3 is a front perspective view of a preferred embodiment of the invention with the first and second adjustable support legs removed from the device case; and, FIG. 4 is a rear perspective view of a preferred embodiment of the invention with the first and second adjustable support legs removed from the device case.

Referring now to FIG. 3, a preferred embodiment of the invention is shown with the legs 30, 35 removed from the device case 20. As shown, the device case 20 has a view port 22 so the user can see the screen of any device inserted therein such as a tablet computer or personal DVD player. The device case 20 also preferably has a device case entry port and lid 23.

The lid 23 is preferably lockable at a port lock 24. The port lock 24 can be theft-resistant and also prevent a device from falling out of the case. Alternately, the case 20 can be custom fit to the size of the device to be held so that device is more tightly held in place in the case 20. The view port 22 preferably is open so that a user can touch and/or access the device within the case 20. However, alternately, the view port 22 can comprise a screen or window to cover/protect the device within. By inserting the device 200 with the face down into case 20,' the case 20 itself also functions as a cover to protect devices contained therein.

Furthermore, the device case 20 preferably has blade ports 21 positioned on each side of the case 20 so that the orientation of the case 20 and electronic device within can be changed from portrait to landscape mode and vice versa. The first and second adjustable support legs 30 and 35 each preferably have an attachment blade or flange 32, 37 for insertion and attachment at the blade ports 21. As the device case 20 is preferably rectangular, the case 20 can display its carried device in portrait and landscape modes depending on the choice of blade ports 21 to position the legs 30, 35. The case 20 in FIG. 3 is shown in portrait mode. By using the other blade ports on the case 20, the case 20 and device contained therein can be displayed in landscape mode.

An alternate embodiment of the device case 20 is a flexible sleeve made of fabric or similar flexible material with a skeletal at least semi-rigid frame contained within the sleeve to give it form and for attachment to the blades 32, 37. The sleeve case 20 could also have pockets for the support legs 30 and 35. The case could be closed with a flap 23 instead of the lid described above. The case 20 would still preferably have a view port 22 as described above. The legs 30, 35 and string 40 would be as described below.

Returning now to the embodiment shown in FIG. 3, the first and second legs 30, 35 preferably further comprise string channels 33, 38. The string 40 preferably ends in first and second adjustment loops 41, 42. The loops 41, 42 pass through the string channels 33, 38 respectively. This allows the device case 20 to hang stable as a platform for the user from the user's neck as shown in FIG. 1. The adjustment loops 41, 42 preferably can be adjusted to vary the useable length of the string 40 and the viewing angle for the case 20. The string channels 33, 38 preferably further comprise string locks 34, 39 to lock the string 40 in place when a desired position and viewing angle are achieved.

The first and second legs 30 and 35 shown in FIG. 3 are shown in extended position. However, the legs 30, 35 are preferably adjustable to differing lengths. The legs 30, 35 can be retracted from the position shown and locked at a new length with leg locks 60, 61. The leg locks 60, 61 preferably insert into steps 62, 63 along leg channels 64, 65. The steps 62, 63 are preferably cut at pre-determined lengths for preferred leg positions.

Figure 4:
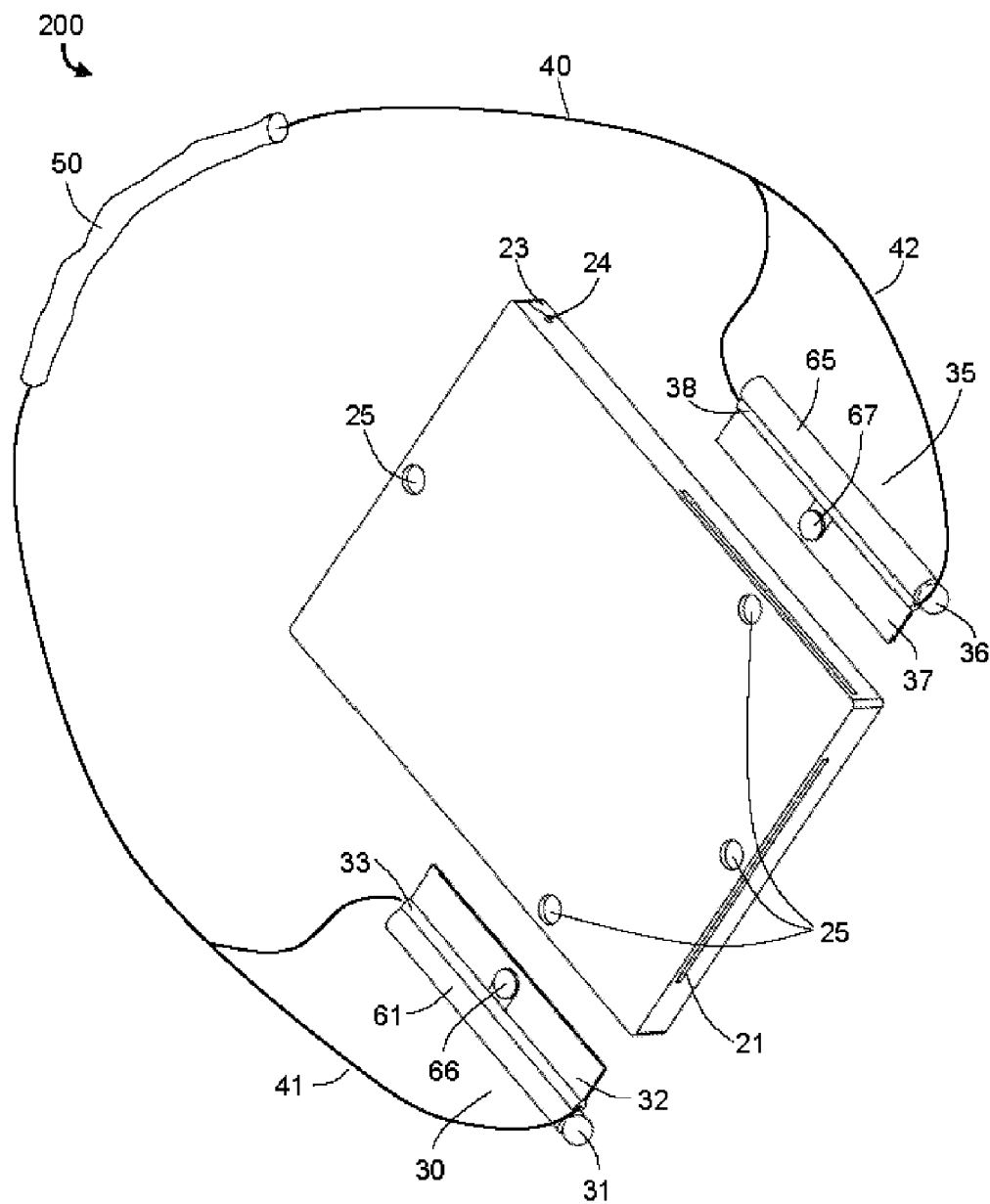

Referring now to FIG. 4, a rear view of a preferred embodiment of the invention is shown, again with the legs 30, 35 removed from the device case 20. In this figure, the legs 30, 35 are shown fully refracted into the leg channels 64, 65. The attachment blades 32, 37 preferably further comprise snap tabs 66, 67 respectively. The snap tabs 66, 67 insert with the blades 32, 37 into the blade ports 21 on the device case 20. When the blades 32, 37 are inserted a sufficient distance into the ports 21, the snap tabs 66, 67 engage tab locks 25 on the back of the device case 20 to hold the blades 32, 37 in place on the case 20. When the user seeks to remove the blades 32, 37 from the case 20, he/she depresses the snap tabs 66, 67 until each disengages from the tab locks 25 and the blades 32, 37 can slide out of the ports 21. However, other lock designs can be used in place of the tab lock embodiment described herein.

Various modifications and alterations of the invention will become apparent to those skilled in the art without departing from the spirit and scope of the invention, which is defined by the accompanying claims. It should be noted that steps recited in any method claims below do not necessarily need to be performed in the order that they are recited. Those of ordinary skill in the art will recognize variations in performing the steps from the order in which they are recited. In addition, the lack of mention or discussion of a feature, step, or component provides the basis for claims where the absent feature or component is excluded by way of a proviso or similar claim language.

While various embodiments of the present invention have been described above, it should be understood that they have been presented by way of example only, and not of limitation. Likewise, the various diagrams may depict an example architectural or other configuration for the invention, which is done to aid in understanding the features and functionality that may be included in the invention. The invention is not restricted to the illustrated example architectures or configurations, but the desired features may be implemented using a variety of alternative architectures and configurations. Indeed, it will be apparent to one of skill in the art how alternative functional, logical or physical partitioning and configurations may be implemented to implement the desired features of the present invention. Also, a multitude of different constituent module names other than those depicted herein may be applied to the various partitions. Additionally, with regard to flow diagrams, operational descriptions and method claims, the order in which the steps are presented herein shall not mandate that various embodiments be implemented to perform the recited functionality in the same order unless the context dictates otherwise.

Although the invention is described above in terms of various exemplary embodiments and implementations, it should be understood that the various features, aspects and functionality described in one or more of the individual embodiments are not limited in their applicability to the particular embodiment with which they are described, but instead may be applied, alone or in various combinations, to one or more of the other embodiments of the invention, whether or not such embodiments are described and whether or not such features are presented as being a part of a described embodiment. Thus the breadth and scope of the present invention should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

A group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise. Furthermore, although items, elements or components of the invention may be described or claimed in the singular, the plural is contemplated to be within the scope thereof unless limitation to the singular is explicitly stated.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, may be combined in a single package or separately maintained and may further be distributed across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives may be implemented without confinement to the illustrated examples. For example, block diagrams and their accompanying description should not be construed as mandating a particular architecture or configuration.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A platform for an electronic device with a screen, comprising:
    a rectangular device case including a landscape position and a portrait position, the case including a back, a view port for the screen,. and four attachment blade ports, where one blade port is on each side of the device case, the four attachment blade ports further comprising blade lock ports on the back;
    a first adjustable support leg including an attachment blade, a padded end and a string lock;
    a second adjustable support leg including an attachment blade, a padded end and a string lock, the attachment blades for the first and second adjustable support legs further comprising blade locks; and
    a length of string with a first end having an adjustment loop attached to the first adjustable support leg and a second end having an adjustment loop attached to the second adjustable support leg, and a sleeve of padding.

2. The platform of claim 1 that has a first deployed position where the sleeve of padding is positioned behind a user's neck and a second carrying position where the sleeve of padding is positioned on the user's shoulder.

3. The platform of claim 1 where the device case further comprises a device case entry port.

4. The platform of claim 1 where the first and second adjustable support legs have adjustable lengths.

5. The platform of claim 1 where adjustment of the length of string at the first and second ends alters a viewing angle of the screen.

6. The platform of claim 1 where the padded ends are urethane.

7. The platform of claim 1 where the padded ends are rubber.

* * * * *